United States Patent [19]

Sharma

[11] Patent Number: 5,610,233
[45] Date of Patent: Mar. 11, 1997

[54] AQUEOUS COATING COMPOSITIONS CONTAINING CELLULOSE ESTERS

[75] Inventor: Mahendra K. Sharma, Kingsport, Tenn.

[73] Assignee: Eastman Chemical Company, Kingsport, Tenn.

[21] Appl. No.: 511,078

[22] Filed: Aug. 3, 1995

[51] Int. Cl.$^6$ ........................................................ C08B 3/22
[52] U.S. Cl. ............................ 525/54.21; 536/76; 536/80
[58] Field of Search ........................... 525/54.21; 536/63, 536/64, 65, 66, 67, 68, 69, 70, 71, 72, 76, 80; 106/169, 178, 181, 183, 186, 196

[56] References Cited

U.S. PATENT DOCUMENTS 2,005,383  6/1935  Murray et al. .
2,327,770  8/1943  Crane .
2,836,590  5/1958  Turner .
4,281,998  8/1981  Sloan ................................................ 8/129
4,543,409  9/1985  Diamantoglou ............................. 536/68
5,182,379  1/1993  Cook et al. .................................. 536/63

FOREIGN PATENT DOCUMENTS 356012  9/1931  United Kingdom .

Primary Examiner—Nathan M. Nutter
Attorney, Agent, or Firm—Harry J. Gwinnell; John D. Thallemer

[57] ABSTRACT

This invention relates to aqueous coating compositions containing water soluble cellulose esters which are crosslinked with a resin system in the presence of an organic sulfonic acid catalyst for the formation of a film. The cellulose esters contain a low degree of substitution performed by solvolysis of cellulose esters of higher degree of substitution in the presence of a carboxylic acid catalyst.

8 Claims, No Drawings

AQUEOUS COATING COMPOSITIONS CONTAINING CELLULOSE ESTERS

FIELD OF INVENTION

This invention relates to aqueous coating compositions containing water soluble cellulose esters which are cross-linked with a resin system in the presence of a catalyst for the formation of a film. The cellulose esters contain a low degree of substitution performed by solvolysis of cellulose esters of higher degree of substitution in the presence of a carboxylic acid catalyst.

BACKGROUND OF THE INVENTION

Cellulose esters are widely used in various applications such as filter tow, pharmaceutical, coatings, printing of several substrates, protecting hard surfaces, molding plastics, forming clear sheets and industrial coatings. In addition, cellulosic polymers which have affinity for water are of immense commercial interest. Water-swellable or water-absorbent polymers are used in absorbent pads, diapers, and various consumer goods. Water-soluble polymers are employed in cosmetics, foods, oil-field application such as oil recovery, drilling etc., and pharmaceutical coatings.

Cellulose acetates with a low degree of substitution (number of substituents per anhydroglucose ring) have high affinity for water. Several references disclose the preparation of water-soluble cellulose esters. For example, British Patent No. 356,012 discloses a process for preparing cellulose monoacetate (CMA) by sulfuric acid catalyzed hydrolysis of cellulose triacetate (CTA) in aqueous sulfuric acid. The product has a degree of substitution of 0.6–0.8 acetyl and is soluble in water. U.S. Pat. No. 2,327,770 discloses a process for preparing cellulose monoacetate by hydrolyzing cellulose diacetate in aqueous acetone or aqueous alcohol using sulfuric acid catalyst. Disadvantages of using the process disclosed in these patents include the use of a nonsolvent to isolate the product, long reaction times, and the necessity for continuous or sequential addition of water to maintain reaction rates which results in a dilute reaction mixture and difficulties in recovery of the by-product acetic acid.

U.S. Pat. No. 2,005,383 discloses a process for solvolyzing cellulose triacetate (CTA) using zinc iodide in ethanol. The product has a degree of substitution about 1.75. Disadvantages associated with this process are long reaction times (40 hours) and large amounts of zinc iodide (10 parts ZnI per part CTA) are consumed in the process.

U.S. Pat. No. 2,836,590 discloses high temperature (>180° C.) alcoholysis of cellulose acetate without the use of catalysts. At the temperatures disclosed, cleavage of the 1,4-glycosidic linkages of the cellulose ester backbone competes with the desired deacylation. U.S. Pat. No. 4,543,409 discloses a process for preparing cellulose monoacetate by acetylating cellulose in a solution of N,N-dimethylacetamide and lithium chloride. The cellulose monoacetate prepared by the process disclosed in U.S. Pat. No. 4,543,409, however, is not soluble in water.

SUMMARY OF THE INVENTION

The aqueous coating compositions of the present invention contain water soluble cellulose esters and provide fast film cure at low temperatures and excellent solvent resistance. The aqueous coating composition comprises:

(A) 1 to 60 weight percent of at least one water-soluble or water dispersible cellulose ester having a weight average molecular weight of 10,000 to 60,000, a hydroxyl value of 100 to 1,000, and an inherent viscosity of 0.05 to 1.5 dL/g, said cellulose ester containing a low degree of substitution in the range of 0.3 to 1.5;

(B) 5 to 90 weight percent of an amino resin cross-linking agent;

(C) 0.1 to 15 weight percent of a catalyst; and (D) 5 to 50 weight percent water.

DETAILED DESCRIPTION OF THE INVENTION

The aqueous coating compositions of the present invention contain a cellulose ester with low degree of substitution relative to the degree of substitution of starting cellulose ester material, a crosslinking resin, and catalyst. As used herein, the term "cellulose ester" refers to cellulose esters, also called "product cellulose esters", which have a low degree of substitution and are used in the aqueous coating compositions of the present invention. The term "starting cellulose esters" refers to cellulose esters having a higher degree of substitution relative to product cellulose esters. The starting cellulose esters are used to prepare the cellulose esters used in the aqueous compositions of the present invention. The cellulose esters contain repeating units of the formula:

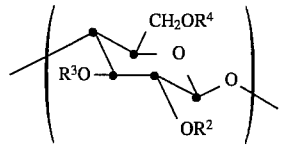

In the above formula for the cellulose ester, $R^2$, $R^3$, and $R^4$ are independently selected from hydrogen, or straight chain alkanoyl, branched chain alkanoyl, aroyl and heteroaroyl group. The alkanoyl, aroyl, and heteroaroyl groups contain 1 to 20 carbon atoms, preferably 2 to 6 carbon atoms. Suitable cellulose esters have between two, for example cellobiose, and 5000 anhydroglucose repeating units.

Starting cellulose esters which are used to prepare the cellulose esters used in the aqueous coating compositions of the present invention have a degree of substitution of 2 to 3. As used herein the term "degree of substitution" refers to the average number of acyl substituents per anhydroglucose ring of the cellulose polymer. Preferably, the starting cellulose esters have a degree of substitution of 2.4 to 3.0.

The degree of substitution of the starting cellulose ester material is greater than that of the product cellulose ester. The product cellulose ester refers to the cellulose ester used in the aqueous coating compositions of the present invention. Product cellulose esters have a degree of substitution of 0.3 to 1.5, preferably 0.5 to 1.0. The inherent viscosity (I.V.) of the product cellulose ester is in the range of 0.05 to 1.5 deciliters per gram, preferably 0.05 to 1.0, most preferably 0.1 to 0.5, as measured at a temperature of 25° C. for a 0.25 gram sample in 100 mL of dimethylsulfoxide (DMSO). Generally, the I.V. of the cellulose ester starting material is slightly higher than the I.V. of the product cellulose ester. A typical I.V. range of the cellulose ester starting material is 1.5 to 3.0. The most preferred cellulose esters for use in the present invention, as both starting material and product cellulose ester are: include cellulose acetate, cellulose propionate, cellulose butyrate, cellulose acetate propionate, and cellulose acetate butyrate.

The cellulose esters have a molecular weight ($M_w$) of 10,000 to 60,000, preferably 25,000 to 50,000. The number average molecular weight of cellulose ester is in the range of 5,000 to 30,000. The polydispersity of the cellulose esters is in the range of 1.05 to 2.0, preferably 1.2 to 1.8. The hydroxyl number of the cellulose ester is 150 to 800, preferably 200 to 500.

Solvent systems for preparing the cellulose esters include at least one solvent selected from water, an alcohol having 1–11 carbon atoms and a polyol having 1–11 carbon atoms. As used herein, the term "polyol" refers to a polyhydric alcohol containing two or more hydroxyl groups. Preferably, the solvent is selected from water, an n-alkanol having 1 to 7 carbon atoms, a branched alkanol having 3 to 7 carbon atoms, or an aryl alkanol having 7 to 11 carbon atoms. More preferably, the n-alkanol group has 1 to 4 carbon atoms and the branched alkanol group has 3 to 4 carbon atoms. Suitable solvents include: water, methanol, ethanol, n-propanol, n-butanol, isopropyl alcohol, benzyl alcohol and ethylene glycol. Methanol, water, and mixtures thereof are the most preferred solvents for use in this invention because of their ready availability, relatively low cost, and ease of handling.

The solvolysis promoters useful in preparing the cellulose ester used in the present invention are carboxylic acids of the formula $R^1$—COOH wherein $R^1$ is selected from hydrogen, a straight chain alkyl group having 1 to 7 carbon atoms, a branched chain alkyl group having 3 to 7 carbon atoms or an aryl group having 6 to 10 carbon atoms. Preferred $R^1$ moieties are straight chain alkyl groups having 1 to 6 carbon atoms and branched chain alkyl groups having 3 to 6 carbon atoms. The most preferred $R^1$ moieties are hydrogen, methyl, ethyl, and n-propyl. Examples of useful carboxylic acid solvolysis promoters include acetic acid, formic acid, propionic acid, and butyric acid.

The quantity of solvolysis promoter employed in the practice of preparing cellulose esters used in the present invention can vary widely. Preferably, the quantity of solvolysis promoter is in the range of 10 to 10,000 mole percent, based on the moles of anhydroglucose repeat units of the cellulose ester. More preferably, the quantity of solvolysis promoter is in the range of 1000 to 3000 mole percent, based on the moles of anhydroglucose repeat units of the cellulose ester.

For preparing cellulose esters used in the present invention, the concentration of cellulose ester starting material in the solvent system can vary widely. A preferred concentration of cellulose ester starting material is 0.33 to 40 percent, calculated as the weight of ester per volume of the solvent system plus solvolysis promoter. More preferably, the concentration of cellulose ester starting material is 10 to 25 percent, calculated as the weight of ester per volume of the solvent system plus solvolysis promoter.

The reaction temperature varies in the range of about 75° C. to about 200° C., preferably 130° C. to 180° C. Most preferably, the reaction temperature is 140° C. to 160° C. The contact time may extend up to 48 hours at low reaction temperatures, however, when the reaction temperature is within the range of 130° C. to 180° C., the contact time is 1 to 24 hours, preferably 10 to 18 hours.

The rate of heating the reaction mixture to the desired reaction temperature should not be so rapid as to cause a significant degree of charring of the starting cellulose ester. The reaction pressure should be sufficient to maintain the components of the solvent system substantially in the liquid state at the desired reaction temperature.

The water-soluble/dispersible cellulose ester is mixed with a crosslinking agent and catalyst to form a network of high molecular weight crosslinked polymer useful in formulating aqueous coating and ink systems. The amino resin, cross-linking agent comprises compounds having a plurality of —N(CH$_2$OR)$_2$ functional groups wherein R is $C_1$-$C_4$ alkyl, preferably methyl. Typical cross-linking agents have the following formulae, wherein R is independently $C_1$-$C_4$ alkyl:

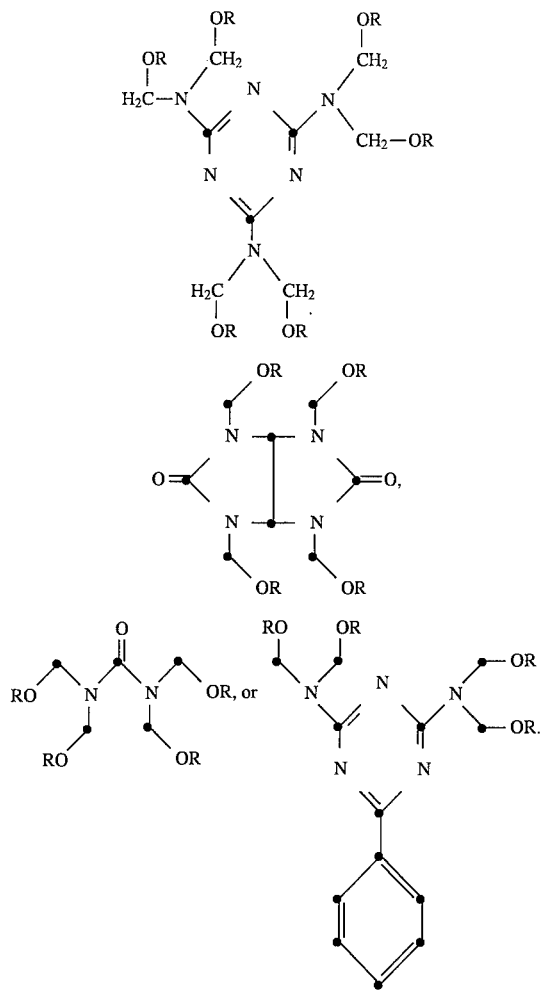

Hexamethoxymethylmelamine, tetramethoxymethylbenzoguanamine, tetramethoxymethylurea, and mixed butoxy/methoxy substituted melamines comprise the preferred cross-linking agents. The most preferred cross-linking agents are methylated ureaformaldehyde resin and hexamethoxymethylamine. The amount of the amino resin cross-linking agent present in the coating compositions can vary considerably depending, for example, on the particular acetoacetate-substituted, film-forming, polymeric material and amino resin cross-linking agent employed. Typically, the amount of cross-linking agent is in the range of about 5 to 90 weight percent, based on the weight of the film-forming, polymeric material. However, the amount of cross-linking agent preferably is in the range of about 10 to 40 weight percent (same basis). Preferred crosslinking agents are commercially available under the trade names "BEETLE" and "CYMEL" from American Cyanamid Company.

Any suitable catalyst can be used to catalyze the reaction. Preferably, an organic sulfonic acid catalyst is employed to catalyzed the reaction of the cellulose ester, film-forming, polymeric material and the amino resin cross-linking agent. The organic sulfonic acid catalyst may be any alkyl, cycloalkyl or aryl, including substituted aryl, sulfonic acid containing up to about 40 carbon atoms. Alkyl-substituted aryl sulfonic acids such as p-toluenesulfonic acid (pTSA), methane sulfonic acid (MSA), diethyl ammonium salt of trifluoromethane sulfonic acid such as FC520 which is available from 3M Company, dodecylbenzenesulfonic acid and dinonylnaphthalenesulfonic acid represent the preferred catalysts. The catalyst is incorporated in the formulation just prior to coating/printing application. The amount of the sulfonic acid cross-linking catalyst present in the coating compositions generally is about 0.1 to 15 weight percent, preferably 0.5 to 8 weight percent, based on the weight of cross-linking agent and polymer present.

The aqueous coating composition may additionally contain 0.1 to 15 weight percent of an additive. Useful additives include, but are not limited to, surfactants, defoamers, slip agents, adhesion promoters, wetting agents, pigments, and plasticizing agents. Combinations of additives may also be added.

If the aqueous coating composition is to be used other than as an overprint varnish or a clear protective coating, a pigment and/or a mixture of pigments may be added to provide the desired color. The pigments may be selected from various organic and inorganic pigments well-known to those skilled in the art. Specific examples include the following: CI Pigment White 6 (titanium dioxide); CI Pigment Red 101 (red iron oxide); CI Pigment Yellow 42, CI Pigment Blue 15, 15:1, 15:2, 15:3, 15:4 (copper phthalocyanines); CI Pigment Red 49:1; and CI Pigment Red 57:1. The organic pigments may be added in an amount up to 25.0 weight percent based on the weight of the coating composition. The inorganic pigments may be added in an amount up to 50.0 weight percent based on the weight of the coating composition.

Several other modifying agents may be added in the coating and/or ink compositions of the present invention. The desired amount of glycols and/or alcohols up to 5.0 weight percent based on the weight of the coating composition may be added in the coating/printing compositions. In addition, processing aids may be added in the compositions. Useful processing aids include, but are not limited to, surfactants, defoaming agents, slip agents, and adhesion promoters.

The cellulose esters used in the Examples have the following properties:

| Properties | Cellulose Esters | |
| --- | --- | --- |
| | A | B |
| Degree of Substitution | 0.85–0.94 | 0.66–0.70 |
| IV | 0.216 | 0.250 |
| Molecular Weight | | |
| Mn | 18.100 | 25,200 |
| Mw | 36,780 | 44,700 |
| Polydispersity | 1.61 | 1.77 |
| Eq. wt./OH | — | 83.29 |
| Hydroxyl Value | — | 673.66 |

The following examples will further illustrate practice of the present invention but should not be interpreted as a limitation thereon.

EXAMPLE 1

This example illustrates the preparation and composition of an aqueous overprint varnish. Cellulose Ester A (30 wt. %) was dissolved in water using a mixing device. The aqueous cellulose ester solution was mixed with methylated urea-formaldehyde resin (BEETLE-65 from American Cynamid) in a 50/50 ratio by weight. The cellulose ester solution used was 30% solid, while BEETLE-65 is 100% solid. An acid catalyst (p-toluene sulfonic acid, p-TSA) was added to the final formulation just prior to the printing and/or coating application. The aqueous thermoset overprint had the following composition:

| Ingredients | Amount (%) |
| --- | --- |
| Cellulose Ester A | 9.00 |
| Methylated Urea-Formaldehyde resin | 70.00 |
| p-Toluene Sulfonic Acid (p-TSA) | 2.40 |
| Deionized Water | 18.60 |

EXAMPLE 2

The aqueous coating prepared in accordance with Example 1 was used for film formation on a printed paper with red ink. The coating was applied on different substrates with RK rod #1. The samples were cured in an oven at 100° C. for 3–10 sec. The water-resistance of the samples was determined by a water-spot test, whereas the solvent resistance was evaluated by rub test. For water-spot test, distilled water drops were left for 5, 10, 15 and 20 minutes and then wiped off gently with a facial tissue. For rub test, a facial tissue or a cotton ball was soaked completely in the solvent and then rubbed off gently for 50–100 counts. The integrity of the film was visually assessed. The water-spot and rub tests were rated as follows:

1. Poor: Total film removed
2. Fair: Partial film removed
3. Good: Dull or discolor film, but no removal
4. Excellent: The film was substantially unchanged The aqueous coating exhibited excellent water and solvent resistance on paper, foil and film.

EXAMPLE 3

The aqueous coating prepared in accordance with Example 1 was evaluated for block/heat resistance. The coating was applied on various substrates as described in Example 2. The samples were examined for block/heat resistance using the PI Sentinel Heat Sealer at 40 psi for 5 seconds. The samples were folded face-to-face printed surface, then placed under sealer at different temperatures. The test was repeated until the blocking occurred. The integrity of the overprint varnish film was visually assessed. The block/heat resistance was rated as follows:

1. Poor: Picked and complete film removed
2. Fair: Picked, but partial film removed
3. Good: Slightly picked, but no film removed
4. Excellent: No picking and no film removed Blocking temperature is defined as the highest temperature where the coated film retains a block/heat resistance rating of greater than 3. The blocking temperature was in the range of 200°–300° F. on the various substrates.

EXAMPLE 4

The aqueous coating prepared in accordance with Example 1 was evaluated for gloss. The coating varnish was applied on various substrates as described in Example 2. The gloss of the dried coating film on printed coated paper with red ink was measured by Labor-Reflektometer RL3 which was obtained by DR Lange in Berlin, Germany. The gloss at three different angles was measured as follows:

| Sample | Gloss at | | |
|---|---|---|---|
| Number | 20° | 60° | 80° |
| A | 26.3 | 74.7 | 68.9 |
| B | 25.0 | 73.8 | 74.0 |
| C | 22.0 | 72.9 | 73.2 |
| D | 23.8 | 73.2 | 73.5 |

The aqueous coating exhibited excellent gloss measurement on various substrates.

COMPARATIVE EXAMPLE 5

Example 2 was repeated except that a commercially available solvent-borne coating CRYSTAPHANE from Sun Chemical Company containing SAA copolymer was used to form a film. The CRYSTAPHANE contained 52.0 wt. % solid and 48.0 wt. % toluene. The gloss of the film measured was as follows:

| Sample | Gloss at | | |
|---|---|---|---|
| Number | 20° | 60° | 80° |
| A | 20.3 | 70.4 | 68.6 |
| B | 18.6 | 69.2 | 70.1 |
| C | 17.8 | 71.0 | 72.5 |
| D | 19.6 | 68.5 | 69.1 |

The gloss results from Example 4 and Comparative Example 5 were compared. The environmentally safe aqueous coating of Example 4 provided higher gloss of the coated/printed film as that of the solvent-borne system used in Comparative Example 5 which is not environmentally acceptable.

EXAMPLE 6

Example 1 was repeated except that Cellulose Ester A (CA)/BEETLE-65 weight ratio is 80/20 instead of 50/50 was used. The heat resistance of the coating film remained the same (e.g 200° F.), while the gloss at 60° measured about 55–65. The water and ketone resistance of the film were excellent on paper and formica substrates.

EXAMPLE 7

Example 6 was repeated except that methane sulfonic acid (MSA) catalyst was used instead of p-TSA for film cure at 100° C. The film curing time was longer (15 sec. vs. 10 sec.) with MSA as compared to p-TSA catalyst. The film properties such as gloss, solvent resistance, block resistance remained the same.

EXAMPLE 8

Example 6 was repeated except that the CA/Beetle-65 weight ratio was 30/70 instead of 80/20. The heat resistance of the film was slightly improved (200° F. versus 210° F.), whereas the gloss at 60° measured about 75–85, which is significantly higher as compared to Example 6. The water resistance and ketone resistance of the film were determined to be excellent for 10 rubs.

EXAMPLE 9

Example 7 was repeated except that additives were added in the coating formulation. The composition was as follows:

| Ingredients | Amount (%) |
|---|---|
| Cellulose Ester A (30% soln) | 18.43 |
| BEETLE-65 | 73.73 |
| p-TSA (48% soln) | 6.45 |
| JONWAX 26 | 0.93 |
| Defoamer | 0.46 |

The coating film properties were excellent. The addition of defoamer decreased the formation of foam. The wax incorporation in the composition decreased the coefficient of friction (COF) as required in certain applications. The results indicate that these additives can be incorporated in the compositions without adversely affecting film properties of the printing/coating film.

EXAMPLE 10

Examples 4 and 6–8 were used to measure film gloss versus aging after film cure. The results demonstrated that the gloss at a 60° angle of light was reduced by 5–10 points after 24 hours film cure. Beyond 24 hours aging, film gloss remained almost constant. The data was as follows:

| Aging Time (Days) | Gloss at 60° |
|---|---|
| 0 | 74.1 |
| 1 | 69.2 |
| 2 | 69.0 |
| 3 | 70.0 |
| 4 | 69.8 |

EXAMPLE 11

Example 8 was repeated except that a blue pigment (3.0%) was added to the formulation. The drawdowns were made in accordance with Example 2. The coating film exhibited excellent adhesion to paper substrates. The film properties such as gloss, water resistance, solvent resistance and rub resistance remained almost the same as in the absence of blue pigment.

EXAMPLE 12

Example 1 was repeated except that Cellulose Ester B was used instead of Cellulose Ester A in formulating an aqueous coating. The coating had the following composition:

| | Amount | |
|---|---|---|
| Ingredients | (g) | (%) |
| Cellulose Ester B (30% solid) | 30.00 | 24.79 |
| Methylated Urea-Formaldehyde resin | 70.00 | 57.85 |
| p-Toluene Sulfonic Acid (p-TSA) | 2.40 | 1.98 |
| Deionized Water | 18.60 | 15.38 |

The film was made on paper as described in Example 2. The gloss at 60° measured 67.7, and the blocking temperature was in the range of 180°–220° F.

EXAMPLE 13

Example 12 was repeated except that the ratio of Cellulose Ester B/Beetle-65 was 20/80 instead of 30/70 in the aqueous coating formulation. The composition of the coating formulation was as follows:

| Ingredients | Amount (g) | (%) |
|---|---|---|
| Cellulose Ester B (30% solid) | 20.00 | 16.53 |
| Methylated Urea-Formaldehyde resin | 80.00 | 66.12 |
| p-Toluene Sulfonic Acid (p-TSA) | 2.40 | 1.98 |
| Deionized Water | 18.60 | 15.37 |

The gloss at 60° of the cured film was in the range of 70–75, and the blocking temperature was in the range of 180°–210° F.

EXAMPLE 14

Example 12 was repeated except that the gloss of the coated film was measured as a function of time after curing in an oven at 100° C. for 10 seconds.

| Aging Time (Days) | Gloss at 60° |
|---|---|
| 0 | 78.1 |
| 1 | 73.2 |
| 2 | 71.0 |
| 3 | 71.4 |
| 4 | 71.2 |

The gloss at 60° decreased about 5 points within 24 hours after film cure. Beyond 24 hours, the gloss remains almost constant.

EXAMPLE 15

Example 14 was repeated except that the diethyl ammonium salt of trifluoromethane sulfonic acid (FC-520) catalyst was used instead of p-toluene sulfonic acid for film curing at 100° C. in an oven. The coated film remained tacky for 30 seconds cured at 100° C. The gloss at 60° of the film was in the range of 70 to 85.

The composition of aqueous coatings, overprints, primers and inks disclosed in this invention exhibit fast drying, low-temperature cure, and improved film properties such as gloss, flexibility, heat resistance, block resistance, alkaline resistance, alcohol resistance, ketone resistance, hydrocarbon resistance, transparency, lay and scuff resistance, and film smoothness on several substrates such as paper, hard surfaces, etc.

What is claimed is:

1. An aqueous coating composition comprising:
    (A) 1 to 60 weight percent of a water-soluble or water dispersible cellulose ester having a weight average molecular weight of 10,000 to 60,000, a hydroxyl value of 100 to 1,000, and an inherent viscosity of 0.05 to 1.5 dL/g, said cellulose ester containing a low degree of substitution in the range of 0.3 to 1.5;
    (B) 5 to 90 weight percent of an amino resin cross-linking agent;
    (C) 0.1 to 15 weight percent of an acid catalyst; and
    (D) 5 to 50 weight percent water,
wherein the water-soluble or water dispersible cellulose ester when dissolved or dispersed in the water and mixed with the amino resin cross-linking agent in the presence of the acid catalyst forms a network of high molecular weight cross-linked polymer.

2. An aqueous coating composition comprising:
    (A) 5 to 50 weight percent of a water-soluble or water dispersible cellulose ester having a weight average molecular weight of 10,000 to 60,000, a hydroxyl value of 100 to 1,000, and an inherent viscosity of 0.05 to 1.5 dL/g, said cellulose ester containing a low degree of substitution in the range of 0.3 to 1.5;
    (B) 5 to 70 weight percent of an amino resin cross-linking agent;
    (C) 0.2 to 12 weight percent of an acid catalyst; and
    (D) 7 to 40 weight percent water,
wherein the water-soluble or water dispersible cellulose ester when dissolved or dispersed in the water and mixed with the amino resin cross-linking agent in the presence of the acid catalyst forms a network of high molecular weight cross-linked polymer.

3. An aqueous coating composition comprising:
    (A) 10 to 35 weight percent of a water-soluble or water dispersible cellulose ester having a weight average molecular weight of 10,000 to 60,000, a hydroxyl value of 100 to 1,000, and an inherent viscosity of 0.05 to 1.5 dL/g, said cellulose ester containing a low degree of substitution in the range of 0.3 to 1.5;
    (B) 10 to 50 weight percent of an amino resin cross-linking agent;
    (C) 0.5 to 8 weight percent of an acid catalyst; and
    (D) 10 to 35 weight percent water,
wherein the water-soluble or water dispersible cellulose ester when dissolved or dispersed in the water and mixed with the amino resin cross-linking agent in the presence of the acid catalyst forms a network of high molecular weight cross-linked polymer.

4. The aqueous coating composition of claim 1 wherein the cellulose ester, component (A), is selected from the group consisting of cellulose acetate, cellulose butyrate, cellulose butyrate, cellulose propionate, cellulose acetate butyrate, cellulose acetate propionate and mixtures thereof.

5. The aqueous coating composition of claim 1 wherein the cross-linking agent is an amino resin selected from the group consisting of fully or partially alkoxylated methoxymelamines, a fully or partially alkoxylated benzoguanamine, or a fully or partially alkoxylated methoxyurea, wherein each alkoxyl group contains up to 4 carbon atoms.

6. The aqueous coating composition of claim 5 wherein cross-linking agent is selected from the group consisting of methylated ureaformaldehyde resin, hexamethoxymethylmelamine derivative, and combinations thereof.

7. The aqueous coating composition of claim 5 wherein cross-linking agent is a fully alkoxylated methylmelamine wherein the alkoxy groups are a mixture of methoxy and butoxy groups.

8. The aqueous coating composition of claim 1 wherein the catalyst is selected from the group consisting of p-toluenesulfonic acid, methane sulfonic acid, diethyl ammonium salt of trifluoromethane sulfonic acid, and combinations thereof.

* * * * *